United States Patent
Salva et al.

(10) Patent No.: US 11,636,778 B2
(45) Date of Patent: Apr. 25, 2023

(54) CORRECTION OF SOFTWARE CODING PROJECTS

(71) Applicant: Holberton School, San Francisco, CA (US)

(72) Inventors: Guillaume Salva, San Francisco, CA (US); Julien Barbier, San Francisco, CA (US)

(73) Assignee: Holberton, Inc., San Francisco, CA (US)

( * ) Notice: Subject to any disclaimer, the term of this patent is extended or adjusted under 35 U.S.C. 154(b) by 355 days.

(21) Appl. No.: 16/382,467

(22) Filed: Apr. 12, 2019

(65) Prior Publication Data

US 2020/0327823 A1 Oct. 15, 2020

(51) Int. Cl.
*G09B 19/00* (2006.01)
*G06F 40/279* (2020.01)
*G06F 40/205* (2020.01)

(52) U.S. Cl.
CPC ....... *G09B 19/0053* (2013.01); *G06F 40/205* (2020.01); *G06F 40/279* (2020.01)

(58) Field of Classification Search
CPC . G09B 19/0053; G06F 40/279; G06F 40/205; G06F 40/20
See application file for complete search history.

(56) References Cited

U.S. PATENT DOCUMENTS

| | | | |
|---|---|---|---|
| 5,259,766 A | 11/1993 | Sack et al. | |
| 6,353,925 B1 | 3/2002 | Stata et al. | |
| 2003/0212924 A1 | 11/2003 | Avvari et al. | |
| 2007/0050678 A1 | 3/2007 | Estes et al. | |
| 2009/0112669 A1* | 4/2009 | Lydon | G06Q 30/0209 463/9 |
| 2010/0146325 A1 | 6/2010 | John | |
| 2010/0306600 A1 | 12/2010 | Shinboku | |

(Continued)

OTHER PUBLICATIONS

International Searching Authority, "Search Report" in application No. PCT/US19/27153, dated Jul. 16, 2019, 10 pages.

(Continued)

*Primary Examiner* — Asher D Kells
(74) *Attorney, Agent, or Firm* — Baker Botts L.L.P.

(57) ABSTRACT

A computer-implemented method comprising: receiving a job from a plurality of priority queues, the job including a deliverable and a plurality of commands; performing a correction procedure on the deliverable, wherein the correction procedure comprises, for each of the plurality of commands: transforming a respective command into a structure of keywords, the structure associated with a flow of execution, the structure including a plurality of nodes, the plurality of nodes including a root node and plurality of parent nodes, each parent node of the plurality of parent nodes having at least one child node, each parent node of the plurality of parent nodes including a keyword in the respective command; traversing the structure according to the flow of execution, executing one or more keywords at one or more parent nodes of the plurality of parent nodes; determining an output of the respective command based on the execution of the one or more keywords at the one or more parent nodes of the plurality of parent nodes.

21 Claims, 6 Drawing Sheets

(56) References Cited

U.S. PATENT DOCUMENTS

| | | | |
|---|---|---|---|
| 2010/0313004 A1* | 12/2010 | Okano | G06F 11/1438 |
| | | | 713/2 |
| 2013/0219374 A1* | 8/2013 | Jain | G06F 8/30 |
| | | | 717/131 |
| 2013/0236860 A1* | 9/2013 | Dewan | G09B 7/02 |
| | | | 434/118 |
| 2015/0205600 A1* | 7/2015 | Grillo | H04L 67/06 |
| | | | 717/101 |
| 2016/0004606 A1 | 1/2016 | Mishra et al. | |
| 2017/0278421 A1 | 9/2017 | Du et al. | |
| 2018/0240356 A1* | 8/2018 | Singh | G09B 7/02 |

OTHER PUBLICATIONS

Current Claims in application No. PCT/US19/2715, dated Jul. 2019, 5 pages.

European Patent Office, "Search Report" in application No. 19174897.9-1231, dated Nov. 15, 2019, 9 pages.

European Claims in application No. 19174897.9-1231, dated Nov. 2019, 4 pages.

European Patent Office, EP Examining Office Action in Application No. 19174897.9, dated Feb. 1, 2023, 11 pages.

Oxford English Dictionary, Definition entry for "correction, n.", Oxford English Dictionary, Jan. 1, 2023, pp. 1-5, XP093017682, retrieved from the Internet: URL:https://www.oed.com/view/Entry/41910?redirectedFrom=correction& (retrieved on Jan. 25, 2023).

\* cited by examiner

Fig. 5

Numberz  500

| Numberz | 502 |
|---|---|
| 0.0 out of 0 points – File is present | |
| 0.0 out of 0 points – Compile program | |
| 0.0 out of 0 points – trace allowed functions: write, putchar | |
| 1.0 out of 1 points – Only 2 putchar | |
| 0.0 out of 3 points – Correct output | |
| Reason: [Got] 0123456789 (10 chars long) [Expected] 0123456789 (11 chars long) | 506 |
| 1.0 out of 1 point – Return SUCCESS | |
| 0.0 out of 1 points – Kernel style code | |
| Reason: 6-print_numberz.c:12: ERROR: parentheses are required on a return statement total: 1 errors, 0 warnings, 14 lines checked | 508 |
| 0.0 out of 1 points – Kernel style documentation | |
| Reason: 6-print_numberz.c:3: warning: no description found for function main | 510 |

504

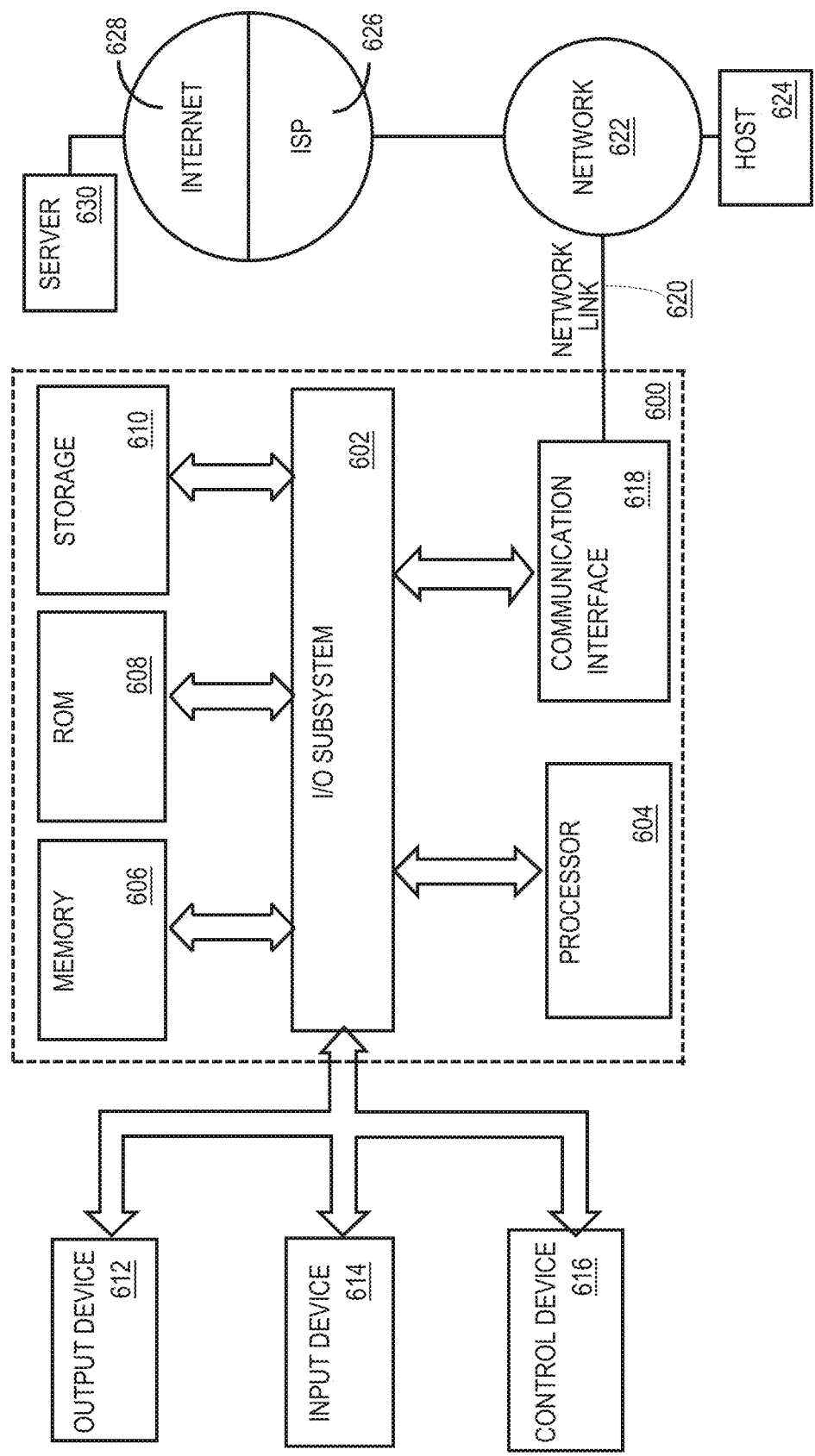

CORRECTION OF SOFTWARE CODING PROJECTS

FIELD OF THE DISCLOSURE

One technical field of the present disclosure is automated correction systems for electronic documents. Another technical field is computer-implemented testing of software coding projects.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The progress of education requires challenging students with projects, then evaluating student projects to determine if student work product is correct in comparison to expected work product. In computer science education, students are commonly given descriptions of projects which, for successful completion, require creation of syntactically correct, semantically correct and working computer program code that produces correct results or output. If errors exist, responsive feedback termed corrections may be communicated to students.

In past programming classes, student assignments have been printed out and corrected or commented on by hand, directly on the paper. However, manually correcting assignments is an exhausting and time-consuming process. To manually validate all checks for even one task of one student's assignment would take a staff member many man hours. In schools having hundreds or thousands of students, manual checking of computer programming products for correctness is not practical for human staff or takes too long. Relying on manual review for a whole cohort or multiple cohorts' assignments would be unsustainable.

Thus, what is needed is a programmed computer system that can automatically validate all checks of programming assignments, produce output indicating errors or corrections in student work within a rapid time that is beyond the capability of humans, and simultaneously make a large-scale education model flexible and scalable.

SUMMARY

The appended claims may serve as a summary of the invention.

BRIEF DESCRIPTION OF THE DRAWINGS

FIG. 4, FIG. 5 illustrate example computer-implemented graphical user interface displays that may be generated and displayed in an embodiment.

FIG. 6 illustrates an example computer system, according to an embodiment.

DETAILED DESCRIPTION

Figure 1:
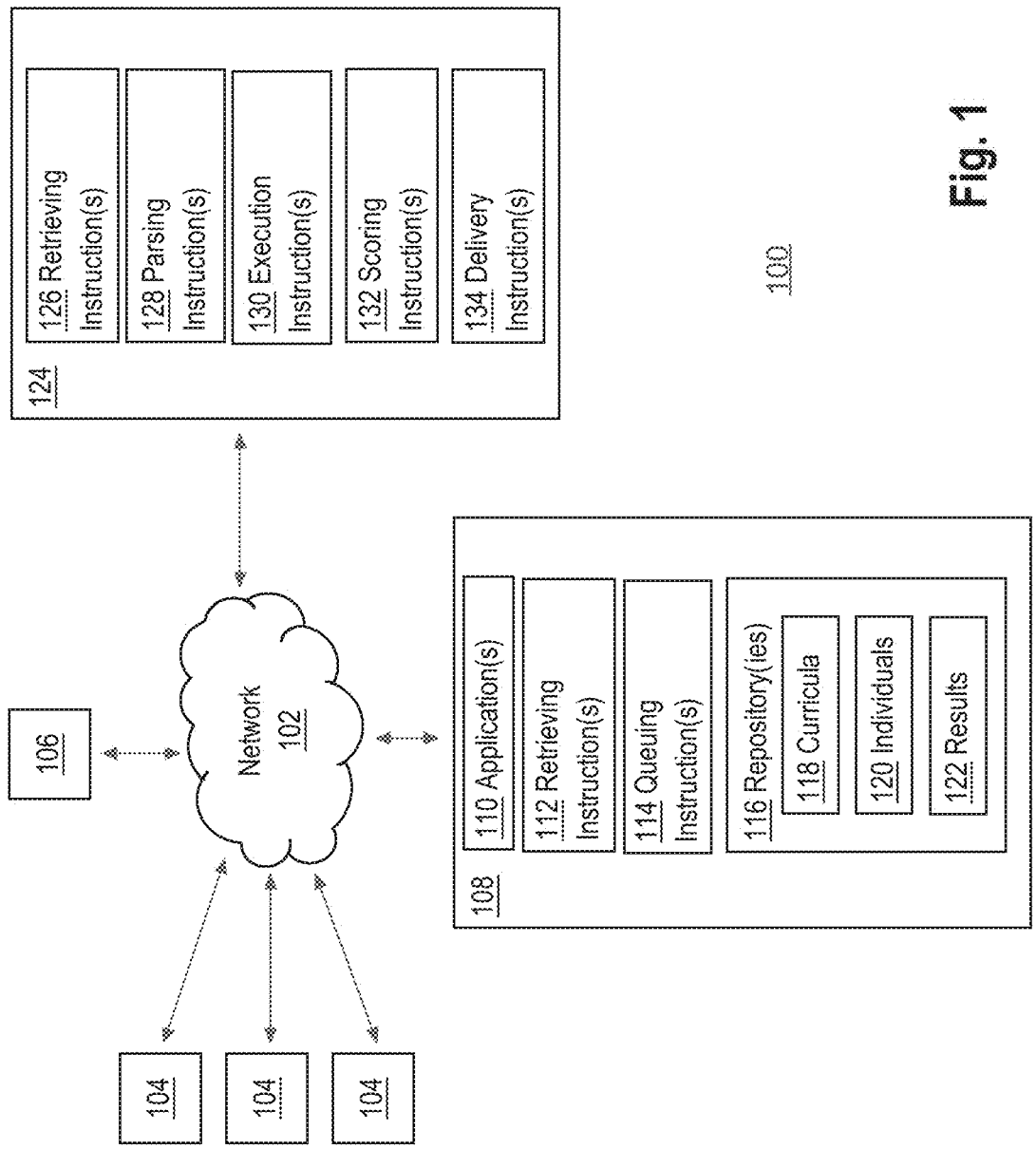
FIG. 1 illustrates a distributed computer system that may be used to implement one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 PROCEDURAL OVERVIEW
4.0 GRAPHICAL USER INTERFACE IMPLEMENTATIONS
5.0 HARDWARE OVERVIEW
6.0 OTHER ASPECTS OF DISCLOSURE 1.0 GENERAL OVERVIEW

An institution (for example, a school) or a department (for example, computer science department) may have tens of thousands of checks across multiple assignments to perform daily. Writing large amounts of code for each check is cumbersome. Large amounts of code not only slow the creation of any new curriculum but also slow responsiveness of student feedback. An important consideration in developing an automatic code correction system is to keep the amount of work for a new curriculum minimal. Another important consideration in developing an automatic code correction system is to make it language independent; the same system should be able to be used for correcting a C project, a Python project, or any other technical task.

In one aspect, a computer-implemented method comprising receiving a job from a plurality of priority queues, the job including a deliverable and a plurality of commands and performing a correction procedure on the deliverable. The correction procedure comprises, for each of the plurality of commands transforming a respective command into a structure of keywords, the structure associated with a flow of execution, the structure including a plurality of nodes, the plurality of nodes including a root node and plurality of parent nodes, each parent node of the plurality of parent nodes having at least one child node, each parent node of the plurality of parent nodes including a keyword in the respective command. The correction procedure further comprises traversing the structure according to the flow of execution, executing one or more keywords at one or more parent nodes of the plurality of parent nodes, and determining an output of the respective command based on the execution of the one or more keywords at the one or more parent nodes of the plurality of parent nodes. The method further comprises using the outputs of the plurality of commands to generate either a first display or a second display depending on whether the priority queue from which the job was received is associated with a first priority or a second priority. The method is performed by one or more computing devices.

Other features, aspects and embodiments will become apparent from the disclosure as a whole including the drawings and claims.

2.0 Structural Overview

In the context of the following, the following definitions apply.

A project is a list of one or more tasks around a topic that students are learning. An example topic is recursion in the C programming language.

A task is an exercise, usually composed of a question, some requirements, a location in a third party repository system for answers and checks. An example task is "Write a function that prints the alphabet in lowercase," and an example location is the public or private repository, identified as holbertonschool-high_level_programming, on the third party repository system. An example third party repository system is one provided by GitHub, Inc. of San Francisco, Calif.

A check is a worded validation of a task associated with some points, such as "the program cannot use the method 'puts'" or "the program displays to the correct output when 'x=12.'"

A command is a code instruction in a correction system language understood by a code correction system, to execute the validation of a check. An example correction system language is GSL correction system language.

A deadline is the date and time when students must complete a project.

A correction is a job sent to the code correction system for validating the work of a student for a task.

FIG. 1 illustrates a network diagram depicting a network system 100, according to an embodiment. In the example of FIG. 1, a plurality of user computers 104, a third party repository system 106, an institution server(s) 108, and an automatic code correction system (CCS) 124 are communicatively coupled via a network 102. Any number of user computers 104 may be used and three (3) are shown in FIG. 1 merely for purposes of providing an illustrative example. Each user computer 104 may comprise a mobile computing device, desktop computer, laptop computer, or other end station. Each user computer 104 is capable of receiving input via a keyboard, pointing device or other input-output device, has a visual data display device and one or more network interfaces that are capable of communication with the network 102.

The network 102 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

The third party repository system 106 may provide a distributed version control and source code management functionality. In an embodiment, each individual of the institution has a public or private individual repository on the third party repository system 106 for storing data. For example, students of the institution may have their own public or private student repositories on the third party repository system 106. For another example, staff members of the institution may have their own private staff repositories on the third party repository system 106. Similarly, the institution may also have its own private institution repository on the third party repository system 106. In some embodiments, the individual repositories and the institution repository are accessible only by the CCS 124 and by respective individuals of the institution.

The institution server 108 may comprise one or more cores, processors, computers and/or virtual machine instances hosted on the premises of the institution. The institution system 108 hosts or executes one or more applications 110 for staff members to design course curricula and for students to work on projects and generate deliverables.

A staff member of the institution may use a user computer 104 to access the one or more applications 110 to design a curriculum for a course. The curriculum may include numerous projects. An example project is a software coding project. Each project may include one or more tasks. At least one check and a corresponding command, including keywords that may be stored in the private institution repository on the third party repository system 106, are created by the staff member for validating aspect(s) of a task. A staff member may use a user computer 104 to access the one or more applications 110 to also create new functions, using these keywords, for execution by the CCS 124.

A student of the institution may use a user computer 104 to access the one or more applications 110 to generate a deliverable (for example, a file containing student code) for each task of a project and to submit all deliverables for the project to his/her own public or private student repository on the third party repository system 106 for testing and grading by the CCS 124. Each deliverable submitted to a public or private student repository on the third party repository system 106, is dated/timestamped upon submission to or receipt by the third party repository system 106.

The institution server 108 may be coupled to a data repository(ies) 116 that is configured for storing information 118 relating to curricula, including commands used by the CCS 124 for automatically correcting deliverables, information 120 relating to individuals of the institution (for example, students and staff members), and information 122 relating to corrections (for example, results). Other information, such as information relating to one or more private repositories on the third party repository system 106 that are accessible by the CCS 124 and/or the institution server 108, may be stored in the data repository 116.

The institution server 108 may be programmed with retrieving instructions 112 and queuing instructions 114. Other sets of instructions may be included to form a complete system such as an operating system, utility libraries, a presentation layer, database interface layer and so forth.

In an embodiment, the retrieving instructions 112 are programmed for retrieving deliverables from public or private student repositories on the third party repository system 106, according to project requirements. For example, the retrieving instructions 112 may be programmed for retrieving only the latest deliverables submitted before a project deadline for correction such that deliverables submitted after the project deadline are not retrieved from the public or private student repositories on the third party repository system 106 for correction. For another example, the retrieving instructions 112 may be programmed for retrieving deliverables stored under correct directories and with correct filenames.

In some embodiments, when retrieving deliverables from public repositories on the third party repository system 106, the institution server 108 (or any other accessing entity, such as the CCS 124) needs to know identifications, such as usernames, associated with the public repositories. In some embodiments, when retrieving deliverables from private repositories on the third party repository system 106, the institution server 108 (or any other accessing entity) needs to know authentication credentials associated with the private repositories. Example authentication credentials are public and private key pairs such as SSH public and private key pairs. The private keys are kept confidential by the institution server 108 (or any other accessing entity).

In some embodiments, each deliverable for a project must be stored in a specific directory in a public or private student repository on the third party repository system 106 and with a specific file name, as directed by the requirements of the project, to be retrieved by the institution server 108. The retrieving instructions 118 may retrieve deliverables for the project using specific identifiers. An example identifier may be a path that identifies a public or private student repository on the third party repository system 106 for a particular student, identifies a directory on the public or private student repository for a particular project, and identifies a filename of a deliverable in the directory that is to be retrieved. An example path is student_A:project1\numberz.sh. student_A identifies the public or private student repository for Student A on the third party repository system 106. project1\ is the directory for Project1.numberz.sh is the filename of the Student A's deliverable for a particular task of Project1. Deliverables for all tasks associated with one project may be included under one directory (for example, project1\). Alternatively, each deliverable for a task associated with the project is included under its own subdirectory, in which case, a path may further identify a subdirectory for a particular task of the project.

In an embodiment, the queuing instructions 114 are programmed for queuing deliverables retrieved from a public or private student repository on the third party repository system 106 into one of different types of queues for correction. For example, two types of queues may be used: a high priority queue and a low priority queue. Deliverables for grading may be placed in a low priority queue, while deliverables for testing may be placed in a high priority queue as testing results are needed right away (for example, for students to test their deliverables for submission) as compared to grading deliverables. The institution server 108 may use a plurality of queues for each priority. For example, an institution may have multiple campuses. The institution server 108 may use a high priority queue and a low priority queue for each campus. For example, deliverables for students attending the San Francisco, will use the low priority queue at midnight to allow faster correction for other campuses in other time zones, like Bogota. Queues of the same type across the multiple campuses have the same priority. The institution server 108 may also use queues of other priorities. Each queued deliverable is a job that is eventually dequeued and corrected against one or more checks of a task that the deliverable addresses, for either testing or grading.

Although the institution server 108 is described as being programmed with the retrieving instructions 112 and the queueing instructions 114, the CCS 124 instead may be programmed with the retrieving instructions 112 and the queueing instructions 114.

The CCS 124 may comprise one or more cores, processors, computers, and/or virtual machine instances hosted on the premises of the institution, or using a public or private cloud computing facility.

The CCS 124 may be programmed with retrieving instructions 126, parsing instructions 128, execution instructions 130, scoring instructions 132, and delivery instructions 134. Other sets of instructions may be included to form a complete system such as an operating system, utility libraries, a presentation layer, database interface layer and so forth.

In an embodiment, the retrieving instructions 126 are programmed for retrieving jobs from the priority queues. Jobs with high priority (such as jobs in high priority queues) are dequeued and received by the CCS 124 for correction before jobs with low priority (such as jobs in low priority queues). Jobs with the same priority are dequeued sequentially from a queue and are dequeued sequentially and chronologically, based on date/timestamps, from across multiple queues of the same priority.

A job includes a deliverable (student code for correction) and is associated with information regarding the private institution repository, information about the student, and one or more checks. Each check may be associated with a corresponding description describing the check and a corresponding command that is understood by the CCS 124 to execute the validation of the check.

In an embodiment, the parsing instructions 128 are programmed for parsing a command, which is a piece of code represented as a string, that validates a check of a task associated with a job and for transforming the command into a structure for execution. When the parsing instructions 128 extracts a keyword from the command, the parsing instructions 128 expects a certain number of arguments to follow the keyword, based on the keyword type. The different keyword types recognized by the CCS 124 are listed in Table 1 below. In some embodiments, the parsing instructions 128 creates a tree of keywords to execute, with each keyword being a parent node, either at the root of the tree or at the root of a subtree, with each argument being child node of the parent node. The tree structure creates a flow of execution and a final decision regarding whether the check passes or not.

For example, a check for a task of a project may include three tests to test three aspects of the task: (1) the student code must contain only one line, (2) the student code must include using commands echo and grep, and (3) the student code must execute successfully. The corresponding command for the check may be op_and (is_equal("1", exec_bash ("wc -l 0-main.sh")), file_contains ("0-main.sh", ["echo", "grep"]), execution_success ("./0-main.sh")).

Figure 2:
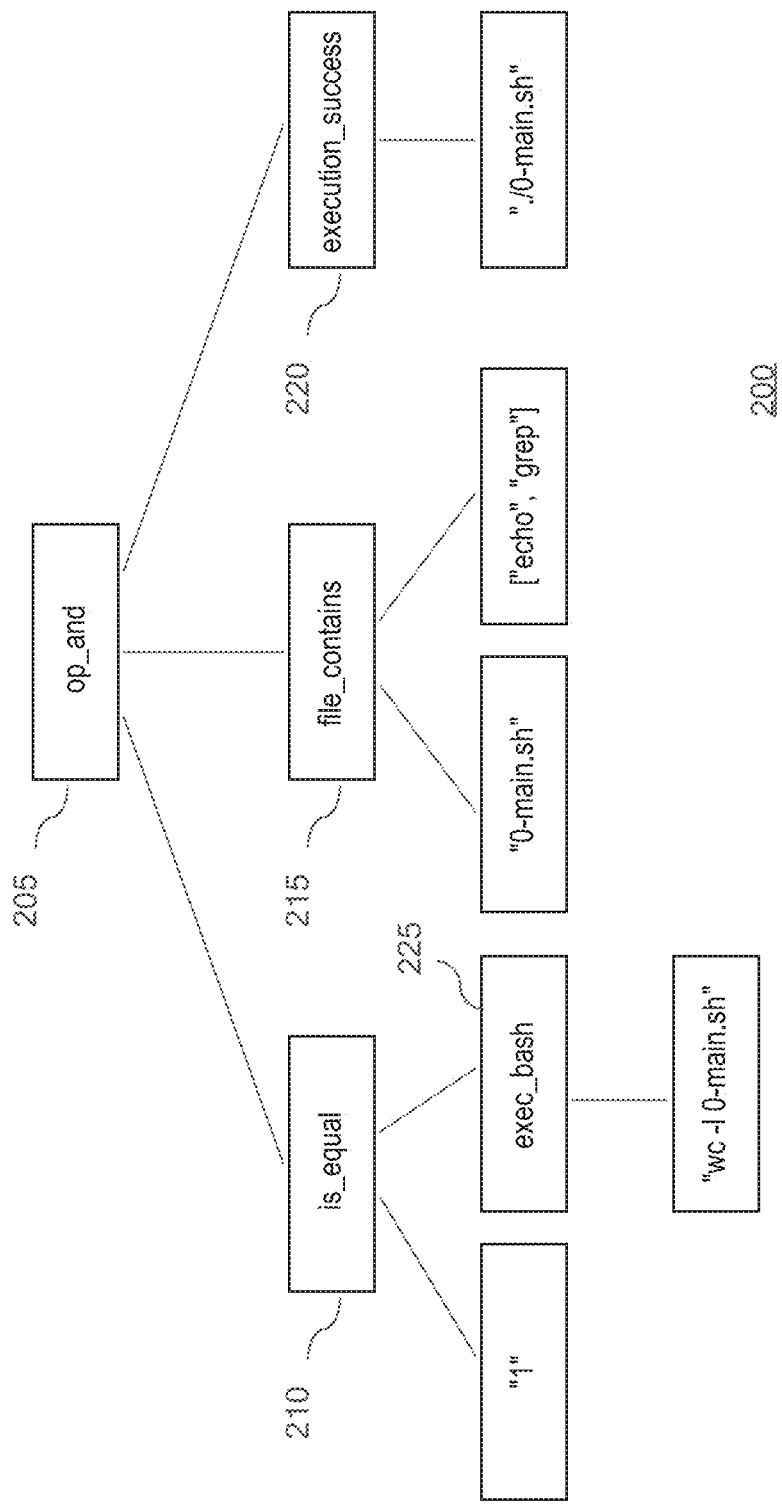
FIG. 2 illustrates an example structure for execution, according to an embodiment.

The parsing instructions 128 parses and transforms this command into the tree illustrated in FIG. 2. The tree 200 of FIG. 2 includes the keywords op_and, is_equal, file_contains, execution_success, and exec_bash as parent nodes 205, 210, 215, 220, 225 in the tree 200. More specifically, the tree 200 includes the keyword op_and as the root (topmost) node 205 and the keywords is_equal, file_contains, execution_success, and exec_bash as subtree root nodes 210, 215, 220, 225. The node 205 is a parent to three child nodes; the node 210 is a parent to two child nodes; the node 215 is a parent to two child nodes; the node 220 is a parent to one child node; and, the node 225 is a parent to one child node. In this example, the keyword op_and at the root of the tree 200 comprises a logic AND operator, which means that all tests must pass to validate the correction of the task.

In an embodiment, the execution instructions 130 are programmed for executing each keyword from the bottom left to the top of the tree 200. When a keyword has another keyword as an argument, the CCS 124 will execute the another keyword first, recursively traversing down the tree (depth first traversal) if necessary. For example, when the execution instructions 130 is at the node 210 with the is_equal keyword, the execution instructions 130 will execute the exec_bash keyword at node 225 first before executing the is_equal keyword at the node 210.

Returning to the above example, the command for the check validates three tests: (1) 0-main.sh has only 1 line (bash command wc -l), (2) 0-main.sh contains echo and grep bash commands, and (3) 0-main.sh executes successfully. Since the keyword op_and means that all tests must pass to validate the correction, if one of the tests fails, then the correction of the task will fail.

In an embodiment, the root of the tree (root node) must be a function. In some embodiments, a function must receive at least one argument and return at least one value. In the example tree illustrated in FIG. 2, the op_and is a function that receives three arguments and returns two values. The three arguments are the three tests described above. The first return value is whether the check passed or not. The second return value is the error to be displayed if the check did not pass. A function may receive more than three arguments and may return more than two values. In some embodiments, a function must return only two values.

In an embodiment, based on which keywords are present in the tree, the tree will or will not fully execute to determine the final decision. For example, if the keyword at the root node is a logic AND operator (such as op_and), and the left part of the tree is raising a failure, then the execution will stop and immediately return the first error. Stopping the execution of a command when the left part of its corresponding tree raises a failure, offers performance improvements by reducing utilization of computing resources at the CCS 124.

Before execution, all keywords are dynamically loaded into the CCS 124 from the private institution repository on the third party repository system 106. Alternatively, only those keywords used in the checks of one, some, or all tasks of the project are dynamically loaded into the CCS 124 from the private institution repository on the third party repository system 106.

During execution, containers may be used to isolate each sensible or critical action since some requirements for students are platform related, for example, student code must compile in Ubuntu 14.04. Containers may be used to limit the impact of "bad" or malicious student code. For example, during a recursion project, if a student code does not have a stop condition (when to stop the recursion), the execution of the student code will never end. For another example, the student code uses too much memory. Containers are used to contain errant behavior and preserve the CCS 124. Containers may be used with or without timeouts.

Returning to FIG. 1, in an embodiment, the scoring instructions 132 are programmed for scoring the task based on all executed or completed checks for the task and generating a full result or output report for the task.

In an embodiment, the delivery instructions 134 are programmed for transmitting the full result to the institution server 108 for storage in the local repository 116. In some embodiments, before a project deadline, the institution server 108 may redact the full result to give students Boolean feedback about their codes. The Boolean feedback provides the students with "hints" to correct/change their codes before deadlines.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the institution server 108, CCS 124, or both.

In an embodiment, the CCS 124 is a command-based system. In some embodiments, the CCS 124 uses four (4) types of keywords listed in Table 1.

TABLE 1

| Keyword Types. | |
| --- | --- |
| Operators | Code operators, such as OR, AND, NOT, etc. |
| Convertors | To convert a type to another, such as from a string to an integer, etc. |
| Simple Functions | To return something specific, such as the number of lines of a file, etc. |
| Functions | To test and validate a statement; returns a Boolean (passed or not) and the error message if not passed, such as is argument 1 equal to argument 2 |

An important component of the CCS 124 is the language of the command. Keywords are defined in the private institution repository on the third party repository system 106. The CCS language is extensible as staff members may create new functions. Table 2 lists example functions executable by the CCS 124 for correction.

TABLE 2

Functions.

absolute_student_path: absolute_student_path(filename)
    Does not check if the file exists.
    Parameters:
        filename (string): Filename of a file inside the student project folder
    Return values:
        (string): Absolute path of filename
betty_code: betty_code(files, options)
    Parameters:
        files (array of strings): Array of files to verify in the student project folder
        options (array of strings): Array of all options (optional)
    Return values:
        (bool): Success or Fail
        (string): Current output of Betty
betty_doc: betty_doc (files, options)
    Parameters:
        files (array of strings): Array of files to verify in the student project folder
        options (array of strings): Array of all options (optional)
    Return values:
        (bool): Success or Fail
        (string): All error outputs of Betty TABLE 2-continued Functions.

compare: compare (command, desired_output_path)
  The command should be executed in less than 10 seconds. It is a strict comparison
  between 2 strings (command output + file of correction). If it is not equal, the final
  output will be formatted and truncated if too long.
  Parameters:
    command (string): Command line to execute in the student project folder
    desired_output_path (string): Path in the corrections folder of the desired
    output
    desired_err_path (string - optional): Path in the corrections folder of the
    desired output on stderr
    with_root (integer - optional): Execute the command with root user => value 1
  Return values:
    (bool): Success or Fail
    (string): Error output if fail (nil if success)
compare_preload: compare_preload(library_path, command,
desired_out_path)
  The command should be executed in less than 10 seconds. It is a strict comparison
  between 2 strings (command output + file of correction). If it is not equal, the final
  output will be formatted and truncated if too long.
  Parameters:
    library_path (string): Full path to the dynamic library to preload
    command (string): Command line to execute in the student project folder
    desired_output_path (string): Path in the corrections folder of the desired
    output
    desired_err_path (string - optional): Path in the corrections folder of the
    desired output on stderr
    with_root (integer -optional): Execute the command with root user => value 1
  Return values:
    (bool): Success or Fail
    (string): Error output if fail (nil if success)
contains: contains (str, contains_words)
  Parameters:
    str (string): String to search
    contains_words (array of strings): List of words searched in the string
  Return values:
    (bool): Success if all words have at least one occurrence in the string,
    otherwise Fail
    (string): nil if Success, otherwise it will be the list of all missing words
copy_and_replace_file: copy_and_replace_file(filename,
search_string, replace_string, output_filename)
  Parameters:
    filename (string): Filename of a file inside the student project folder
    search_string (string): String searched in filename to be replaced
    replace_string (string): New string
    output_filename (string): Filename of the new file
  Return values:
    (boolean): true if filename found and output_filename created
copy_and_replace_file_regex: copy_and_replace_file_regex(filename,
search_string, replace_string, output_filename)
  Parameters:
    filename (string): Filename of a file inside the student project folder
    search_string (string): Regex searched in filename to be replaced
    replace_string (string): New string
    output_filename (string): Filename of the new file
  Return values:
    (boolean): true if filename found and output filename created
copy_files: copy_files(files)
  Parameters:
    files (array of strings): Array of files to copy from correction folder to student
    project folder (skip .h files)
    skip_header_file (integer -optional): Skip .h files if equal to 1
  Return values:
    (bool): Success or Fail
    (string): Error if fail (nil if success)
count_allocations: count_allocations(command)
  The command should be executed in less than 10 seconds. Strict comparison with 0
  error.
  Parameters:
    command (string): Command line to execute in the student project folder
  Return values:
    (integer): Number of bytes allocated during the execution of the command
count_calls: count_calls(command, function_to_trace)
  The command should be executed in less than 10 seconds. The result of ltrace will be
  stored in a file.
  Parameters:
    command (string): Command line to execute in the student project folder
    function_to_trace (string): The function to trace TABLE 2-continued Functions.

Return values:
    (integer): The number of call to @function_to_trace
doctest_number_failed: doctest_number_failed(file, options= [ ])
  Execute doctest on a specific file.
  Parameters:
    file (string): File path to test from the student folder
    options (array of strings): Options for doctest (optional)
  Return values:
    (integer): Number of tests failed
doctest_number_passed: doctest_number_passed(file, options=[ ])
  Execute doctest on a specific file.
  Parameters:
    file (string): File path to test from the student folder
    options (array of strings): Options for doctest (optional)
  Return values:
    (integer): Number of tests passed
exec_bash: exec_bash(command)
  Execute bash command in the student folder. Raw command, no timeout added.
  Parameters:
    command (string): Bash command to run
    with_root (integer -optional): Execute the command with root user=> value 1
  Return values:
    (string): Stdout of the command
execution_success: execution_success(command)
  The command should be executed in less than 10 seconds or the specified timeout.
  Parameters:
    command (string): Command line to execute in the student project folder
    timeout (integer): Timeout for the command in seconds
  Return values:
    (bool): Success if the command has been correctly executed, otherwise Fail
    (string): Always nil
extract_ip: extract_ip(string)
  Parameters:
    string (string): String value to extract IP address
  Return values:
    (string): IP address or nil if not found
file_contains: file_contains(filename , contains_words)
  Parameters:
    filename (string): Filename of a file in the student project folder
    contains_words (array of strings): List of words searched in the file
  Return values:
    (bool): Success if all words have at least one occurrence in the file, otherwise Fail
    (string): nil if Success, otherwise it will be the list of all missing words
file_contains_regex: file_contains_regex(filename, regex, case_sensitive = 1)
  Parameters:
    filename (string): Filename of a file in the student project folder
    regex (strings): Regex used to verify if the file contains or not something
    case_sensitive (integer): 1 for case sensitive (default)
    make_dot_match_newlines (integer): 1 to make dot match newlines (default: 0)
  Return values:
    (bool): Success if the regex found something, otherwise Fail
    (string): Always nil
file_content: file_content(path)
  Parameters:
    path (string): Path of the file to get content
  Return values:
    (string): File content or nil if the file doesn't exist
files_empty: files_empty(files)
  Parameters:
    files (array of strings): List filename in the student project folder
  Return values:
    (bool): Success if all files are present and empty in the student project folder
    (string): nil if Success, otherwise it will be the list of all not empty files
files_exist: files_exist(files)
  Parameters:
    files (array of strings): List filename in the student project folder
  Return values:
    (bool): Success if all files are present in the student project folder
    (string): nil if Success, otherwise it will be the list of all missing files
folders_exist: folders_exist(folders)
  Parameters:
    folders (array of strings): List folder name in the student project folder
  Return values:
    (bool): Success if all folders are present in the student project folder
    (string): nil if Success, otherwise it will be the list of all missing folders TABLE 2-continued Functions.

gcc: gcc(files, output_name=nil, options=nil, skip_warning=0)
  GCC is used with all flags.
  Parameters:
    files (array of strings): List filename to compile (in the student project folder
    or in correction)
    output_name (string - optional): Optional filename of the executable file
    options (string - optional): Strings of options to replace common options at the
    compilation line
    skip_warning (integer - optional): Don't check warning if equal to 1
  Return values:
    (bool): Success if the compilation has been done without any errors, otherwise
    Fail
    (string): Error output (empty if success)
git_change_branch: git_change_branch(branch_name)
  Parameters:
    branch_name (string): Branch_name
  Return values:
    (bool): Success if the repository has been changed to another branch,
    otherwise Fail
    (string): Error message if fail
git_clone: git_clone(user, repo)
  Parameters:
    user (string): Repository owner
    rep(string): Repository name
  Return values:
    (bool): Success if the repository was clone, otherwise Fail
    (string): Error message if fail
git_commit_id_by_message: git_commit_id_by_message(commit_message)
  Parameters:
    commit_message (string): Commit message to search in the current repo
    branch
  Return values:
    (string): Commit ID related to commit message
git_repository_exists: git_repository_exists(name)
  Parameters:
    name (string): Repository name
  Return values:
    (bool): Success if the repository exists, otherwise Fail
    (string): Error message if fail
git_reset: git_reset( )
  Return values:
    (bool): Always success
    (string): No message
http_get: http_get(url, follow_redirect=true)
  Parameters:
    url (string): URL to GET content
    follow_redirect (integer): Define if we follow or not redirection, status 301
    (default: 1)
    basic_auth (array of string): Define basic auth
  Return values:
    (string): Page's content
http_return_code: http_return_code(url, follow_redirect=true)
  Parameters:
    url (string): URL to check status code
    follow_redirect (bool): Define if we follow or not redirection, status 301
    (default: true)
  Return values:
    (integer): Status code. 404 if url is nil; 0 if cannot connect to the URL
is_equal: is_equal(value1, value2)
  Parameters:
    value1 (?): First value
    value2 (?): Second value
  Return values:
    (bool): Success if value1 is equal to value2, otherwise Fail
    (string): nil if Success, comparison if fail
is_null: is_null(value)
  Parameters:
    value (?): value to verify
  Return values:
    (bool): Success if value is equal to nil, otherwise Fail
    (string): Always nil
ltrace: ltrace (command, functions_allowed)
  The command should be executed in less than 10 seconds. The result of ltrace will be
  stored in a file.
  Parameters:
    command (string): Command line to execute in the student project folder
    functions_allowed (array of strings): List of all allowed functions TABLE 2-continued Functions.

Return values:
    (bool): Success if ltrace doesn't find unallowed functions, otherwise Fail
    (string): List of unallowed functions used if Fail, otherwise nil
ltrace_not: ltrace_not(command, functions_unallowed)
  The command should be executed in less than 10 seconds. The result of ltrace will be
  stored in a file.
  Parameters:
    command (string): Command line to execute in the student project folder
    functions_unallowed (array of strings): List of all not allowed functions
  Return values:
    (bool): Success if ltrace doesn't find unallowed functions, otherwise Fail
    (string): List of unallowed functions used if Fail, otherwise nil
make: make(rule="all",makefile="Makefile", options=nil)
  Run a Makefile using make(1).
  Parameters:
    rule (string - optional): Rule to be executed
    makefile (string - optional): Path to the Makefile to be called from the student
    project folder
    options (string - optional): Strings of options for the make(1) command
  Return values:
    (bool): Success if the compilation has been done without any errors, otherwise
    Fail
    (string): Error output (empty if success)
malloc: malloc(command, fake_malloc_file)
  The command should be executed in less than 10 seconds.
  Parameters:
    command (string): Command line to execute in the student project folder
    fake_malloc_file (string): Filename of the fake library used for detecting
    malloc (from the correction folder)
  Return values:
    (bool): Success if segmentation fault, otherwise Fail
    (string): Error message if Fail, otherwise nil
nasm: nasm ( files, options=nil)
  NASM is used to compile ASM files to object files.
  Parameters:
    files (array of strings): List filename to compile (in the student project folder
    or in correction)
    options (string - optional): Strings of options to replace common options at the
    compilation line
  Return values:
    (bool): Success if the compilation has been done without any errors, otherwise
    Fail
    (string): Error output (empty if Success)
number_lines: number_lines(path)
  Parameters:
    path (string): Path of the file to get number of line
  Return values:
    (integer): Number of line in the file
number_occurrences: number_occurrences (path, word)
  Parameters:
    path (string): Path of the file to check content
    word (string): Word to search in the file
    case sensitive (integer): 1 for case sensitive (default)
  Return values:
    (integer): Number of occurrences of word in the file
op_and: op_and (fct_result_1, fct_result2, *fct_result_more)
  Compute the AND operation on all functions results.
  Parameters:
    fct_result_1 (function): Function result 1
    fct_result_2 (function): Function result 2
    *fct_result_more (function): Optional list of function results
  Return values:
    (bool): Success if all fct_result are true
    (string): Always nil
op_ge: op_ge(value1, value2)
  Greater or Equal.
  Parameters:
    value1 (integer): Value 1
    value2 (integer): Value 2
  Return values:
    (bool): Success if value1 >= value2
    (string): Always nil
op_gt: op_gt(value1, value2)
  Greater than.
  Parameters:
    value1 (integer): Value 1
    value2 (integer): Value 2

TABLE 2-continued

Functions.

```
    Return values:
        (bool): Success if value1 > value2
        (string): Always nil
op_le: op_le(value1, value2)
    Lower or Equal.
    Parameters:
        value1 (integer): Value 1
        value2 (integer): Value 2
    Return values:
        (bool): Success if value1 <= value2
        (string): Always nil
op_lt: op_lt(value1, value2)
    Greater than.
    Parameters:
        value1 (integer): Value 1
        value2 (integer): Value 2
    Return values:
        (bool): Success if value1 < value2
        (string): Always nil
op_not: op_not(fct_result)
    Reverse the answer of fct_result.
    Parameters:
        fct_result (function): Function result
    Return values:
        (bool): Success if fct is Fail
        (string): Always nil
op_or: op_or(fct_result_1, fct_result_2, *fct_result_more)
    Compute the OR operation on all functions results.
    Parameters:
        fct_result_1 (function): Function result 1
        fct_result_2 (function): Function result 2
        *fct_result_more (function): Optional list of function results
    Return values:
        (bool): Success if one fct_result are true
        (string): Always nil
pep8: pep8 (files, options)
    Parameters:
        files (array of strings): Array of files to verify in the student project folder
        options (array of strings): Array of all options (optional)
    Return values:
        (bool): Success or Fail
        (string): Current output of pep8
port_open: port_open (url, port)
    A timeout of 1 second is used.
    Parameters:
        url (string): URL to check if a port is open
        port (integer): Port number to check
    Return values:
        (bool): Success if the port is open, otherwise Fail
        (string): Error message if Fail, otherwise nil
preproc_contains: preproc_contains (filename, contains_words)
    Find words in a preprocessed C file.
    Parameters:
        filename (string): Filename of a file in the student project folder
        contains_words (array of strings): List of words searched in the file
    Return values:
        (bool): Success if all words have at least one occurrence in the file, otherwise
            Fail
        (string): nil if Success, otherwise it will be the list of all missing words
puppet_lint: puppet_lint (files, options)
    Parameters:
        files (array of strings): Array of files to verify in the student project folder
        options (array of strings): Array of all options (optional)
    Return values:
        (bool): Success or Fail
        (string): Current output of puppet-lint
py_unittests: py_unittests (path)
    Parameters:
        path (string): Path to test folder or file
        options (string, optional) : Options to pass to unittest
    Return values:
        (bool): Success or Fail
        (string): Unittest test output
py_unittests_number: py_unittests_number(path)
    Parameters:
        path (string): Path to test folder or file
        options (string, optional): Options to pass to unittest
```

TABLE 2-continued

Functions.

Return values:
   (integer): Number of tests found
pycodestyle: pycodestyle (files, options)
  Parameters:
    files (array of strings): Array of files to verify in the student project folder
    options (array of strings): Array of all options (optional)
  Return values:
    (bool): Success or Fail
    (string): Current output of pycodestyle
replace_characters: replace_characters (input, search_string,
replace_string)
  Parameters:
    input (string): Input string where we will search and replace string
    search_string (string): Searched string in input
    replace_string (string): New string to replace all search string found in input
  Return values:
    (string): New string with replacements
resolve_ip: resolve_ip (url)
  Parameters:
    url (string): URL to resolve an IP
  Return values:
    (string): IP address of the URL (by a simple extraction or a real resolution)
run_bash: run_bash (command, desired_output, with root=1)
  Execute bash command in the student folder. Raw command, no timeout added.
  Parameters:
    command (string): Bash command to run
    desired_output (string): Expected output on command success
    with root (integer - optional): Execute the command with root user => value 1
  Return values:
    (bool): Success if command output is equal to desired output, otherwise Fail
    (string): nil if Success, command output if Fail
sass_compile: sass_compile(files, output_name, options=nil)
  SASS compilation.
  Parameters:
    files (array of strings): List filename to compile (in the student project folder
    or in correction)
    output_name (string): Filename of the output file
    options (string -optional): Strings of options to SASS
  Return values:
    (bool): Success if the compilation has been done without any errors, otherwise
    Fail
    (string): Error output (empty if success)
scp_exec: scp_exec(host, login, password, text, path_dest)
  Parameters:
    host (string): Host of the server
    login (string): Login
    password (string): Password
    text (string): Text of the file
    path_dest (string): Path of the file
  Return values:
    (string): stdout
semistandard: semistandard(files, options)
  Parameters:
    files (array of strings): Array of files to verify in the student project folder
    options (array of strings): Array of all options (optional)
  Return values:
    (bool): Success or Fail
    (string): Current output of semi standard
shellchecker: shellchecker (files, options)
  Parameters:
    files (array of strings): Array of files to verify in the student project folder
    options (array of strings): Array of all options (optional)
  Return values:
    (bool): Success or Fail
    (string): Current output of shellchecker
ssh_exec: ssh_exec{host, login, password, command)
  Parameters:
    host (string): Host of the server
    login (string): Login password (string): Password
    command (string): Command to be executed in the server
  Return values:
    (string): stdout
substring: substring (text, sub_array)
  Parameters:
    text (string): Text to extract sub string
    sub_array (array of integer): Sub array to extract (ex: [0,10] =[10] / [0,-2] / [-1])

TABLE 2-continued

Functions.

```
    Return values:
        (string): Sub string of text
to_float_value: to_float_value(v)
    Parameters:
        v (?): input value, any type
    Return values:
        (float): Float representation of v (0 if cannot be converted)
to_integer_value: to_integer_value (v)
    Parameters:
        v (?): input value, any type
    Return values:
        (int): Integer representation of v (0 if cannot be converted)
to_string_value: to_string_value (v)
    Parameters:
        v (?): input value, any type
    Return values:
        (string): String representation of v (0 if cannot be converted)
valgrind_error: valgrind_error(command)
    The command should be executed in less than 10 seconds. Strict comparison with 0
    error.
    Parameters:
        command (string): Command line to execute in the student project folder
    Return values:
        (bool): Success if no error, otherwise Fail
        (string): Valgrind output if Fail, otherwise nil
valgrind_leak: valgrind_leak(command)
    The command should be executed in less than 10 seconds. Strict comparison with no
    leaks.
    Parameters:
        command (string): Command line to execute in the student project folder
    Return values:
        (bool): Success if no leaks, otherwise Fail
        (string): Valgrind output if Fail, otherwise nil
valid_number_of_lines: valid_number_of_lines( file, number)
    The file should finish with a newline character.
    Parameters:
        file (string): File name in the student folder
        number (integer): Number of lines required
    Return values:
        (bool): Success if the file has exactly the right number of lines, otherwise Fail
        (string): Error message if Fail, otherwise nil
words_not_allowed: words_not_allowed( filename, not_allowed_words)
    Parameters:
        filename (string): Filename of a file in the student project folder
        no_allowed_words (array of strings): List of words searched in the file (not
        allowed)
        skip_comment_line (integer -optional): Skip comment line (default: 1)
    Return values:
        (bool): Success if none of not allowed words has been found
        (string): nil if Success, otherwise it will be the list of all not allowed words
        found
```

Not only is the CCS language extensible, the CCS language and containers allow corrections of student code of any language. For example, the CCS 124 may run a correction of a program written in the C programming language, Python, shell scripts, Perl, Ruby, Java, JavaScript, etc. Containers provide environments to build and/or execute student assignments.

When a project is assigned, students are provided with instructions regarding what deliverables (for example, number of files) for the project to turn in, when to submit the deliverables (for example, deadline), how to submit the deliverables (for example, filename to use), and where to turn in the deliverables (for example, under which directories). The institution server 108 provides all corrections for the project to the CCS 124. For each correction, the CCS 124 downloads or otherwise retrieves a deliverable (a file containing student code), accesses all commands of corresponding checks, and parses and executes each of the commands. After automatically correcting the task, the CCS 124 generates a full result or output of the task, which is sent from CCS 124 to the institution server 108 for storage. In some embodiments, the full result or output is also stored by the CCS 124. Before a deadline, students may use the CCS 124 to test/validate basic requirements of their code, such as whether the correct filename is used and whether the deliverable followed all mandatory requirements. In an embodiment, the students do not have access to full results or outputs of the CCS 124 before the deadline.

3.0 Procedural Overview

Figure 3B:
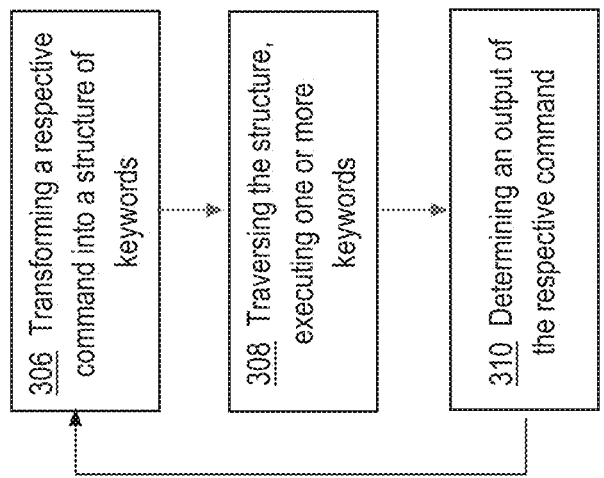
FIG. 3A, FIG. 3B illustrate an example method that may govern the operation of an automatic code correction system, according to an embodiment.
Figure 3A:
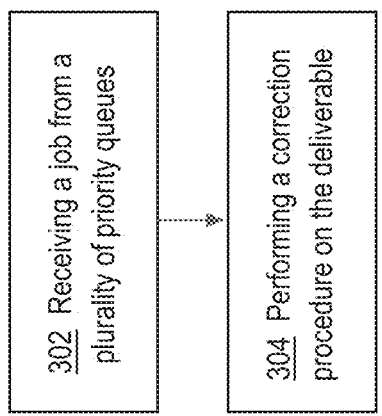

FIG. 3A, FIG. 3B illustrate an example method that may govern the operation of an automatic code correction system, according to an embodiment. Method 300 includes operations, functions, and/or actions as illustrated by blocks 302-310. For purposes of illustrating a clear example, the method of FIG. 3A, FIG. 3B is described herein with reference to execution using certain elements of FIG. 1; however, FIG. 3A, FIG. 3B may be implemented in other embodiments using computing devices, programs or other computing elements different than those of FIG. 1. Further, although the blocks 302-310 are illustrated in order, the blocks may also be performed in parallel, and/or in a different order than described herein. The method 300 may also include additional or fewer blocks, as needed or desired. For example, the blocks 302-310 can be combined into fewer blocks, divided into additional blocks, and/or removed based upon a desired implementation.

FIG. 3A, FIG. 3B may be implemented using one or more computer programs or other software elements organized as sequences of instructions stored on computer-readable storage media. FIG. 3A, FIG. 3B, and each other flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 3; the development, deployment, testing and debugging of functional programs is deemed to be within the high level of skill in the art to which this disclosure pertains.

In addition, each block 302-310 may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of blocks 302-310 may represent circuitry that is configured to perform the logical functions and operations of method 300.

The method 300 begins at step 302, in which a job from a plurality of priority queues is received at a code correction system (CCS). An example CCS is the CCS 124 of FIG. 1. The job may be retrieved from a high priority queue or from a low priority queue if the high priority queue is empty. The job includes a deliverable (for example, student code location) and a plurality of commands to validate the correction of a task associated with the deliverable. Each of the plurality of commands is an executable code for validating a check of the task.

In an embodiment, an institution server, such as the institution server 108 of FIG. 1, uses identifiers to retrieve deliverables from a third party repository system and queues each deliverable retrieved from the third party repository system into one of the plurality of priority queues. Each of the identifiers may identify a specific repository on the third party repository system, a specific directory in the specific repository, and a specific file. In an embodiment, deliverables for testing are queued in one or more queues of the plurality of queues that are of one priority (such as high priority) and deliverables for grading are queued in one or more queues of the plurality of priority queues that are of another priority (such as low priority). Each of the deliverables for grading is automatically retrieved for queuing in the one or more queues of the plurality of priority queues that are of the second priority at a predetermined time after a deadline. When the CCS is available for correction, the CCS retrieves a job from the plurality of priority queues. The job includes a location of where a corresponding student code is located/stored at the institution server.

At step 304, a correction procedure is performed on the deliverable. The correction procedure is performed for each of the plurality of commands for validating a check of the task.

FIG. 3B illustrates an example correction procedure performed at step 304.

At step 306, a respective command is transformed into a structure of keywords. In an embodiment, the CCS parses the respective command to extract each keyword in the respective command. The structure of keywords is associated with a flow of execution. The structure of keywords includes a plurality of nodes. The plurality of nodes includes a root node and plurality of parent nodes. Each parent node of the plurality of parent nodes has at least one child node. In addition, each parent node of the plurality of parent nodes includes a keyword in the respective command. Each keyword extracted from the respective command is a parent node. The number of arguments for a keyword is the number of child nodes the parent node corresponding to the keyword has. The first keyword extracted from the respective command is the root node.

At step 308, the structure is traversed according to the flow of execution. One or more keywords at one or more parent nodes of the plurality of parent nodes are executed. The flow of execution begins bottom left to the top of the structure. In an embodiment, the flow of execution is stopped when a part of the tree (such as the left part of the tree) is raising a check failed signal. For example, the flow of execution is stopped when a student error is raised. In this manner, computer performance is improved at the CCS 124. For example, the correction procedure may validate the next check of the task instead of continuing to validate the current check that is going to fail, thereby total shortening correction time and increasing the number of jobs that can be completed with a period. In addition, throughput and bandwidth may be optimized and utilization of computing resources may be reduced at CCS 124.

At step 310, an output of the respective command is determined based on the execution of the one or more keywords at the one or more parent nodes of the plurality of parent nodes. In an embodiment, the output includes whether the check passed or not and, if not, the error.

After the correction procedure is performed on the deliverable, the institution server receives the outputs of the plurality of commands from the CCS. The CCS displays at least a portion of the outputs, depending on whether the correction is for testing or for grading. In an embodiment, a portion but not the entirety of outputs is displayed when the correction is for testing. The portion may include only Boolean feedback, indicating which checks are validated (passed) and which checks are problematic (not passed) in a validation interface. In an embodiment, the outputs of the plurality of commands are used to generate either first display or a second display depending on whether the priority queue from which the job was received is associated with a first priority or a second priority. Example displays are further discussed below and illustrated in FIG. 4 and FIG. 5.

4.0 Graphical User Interface Implementations

Figure 4:
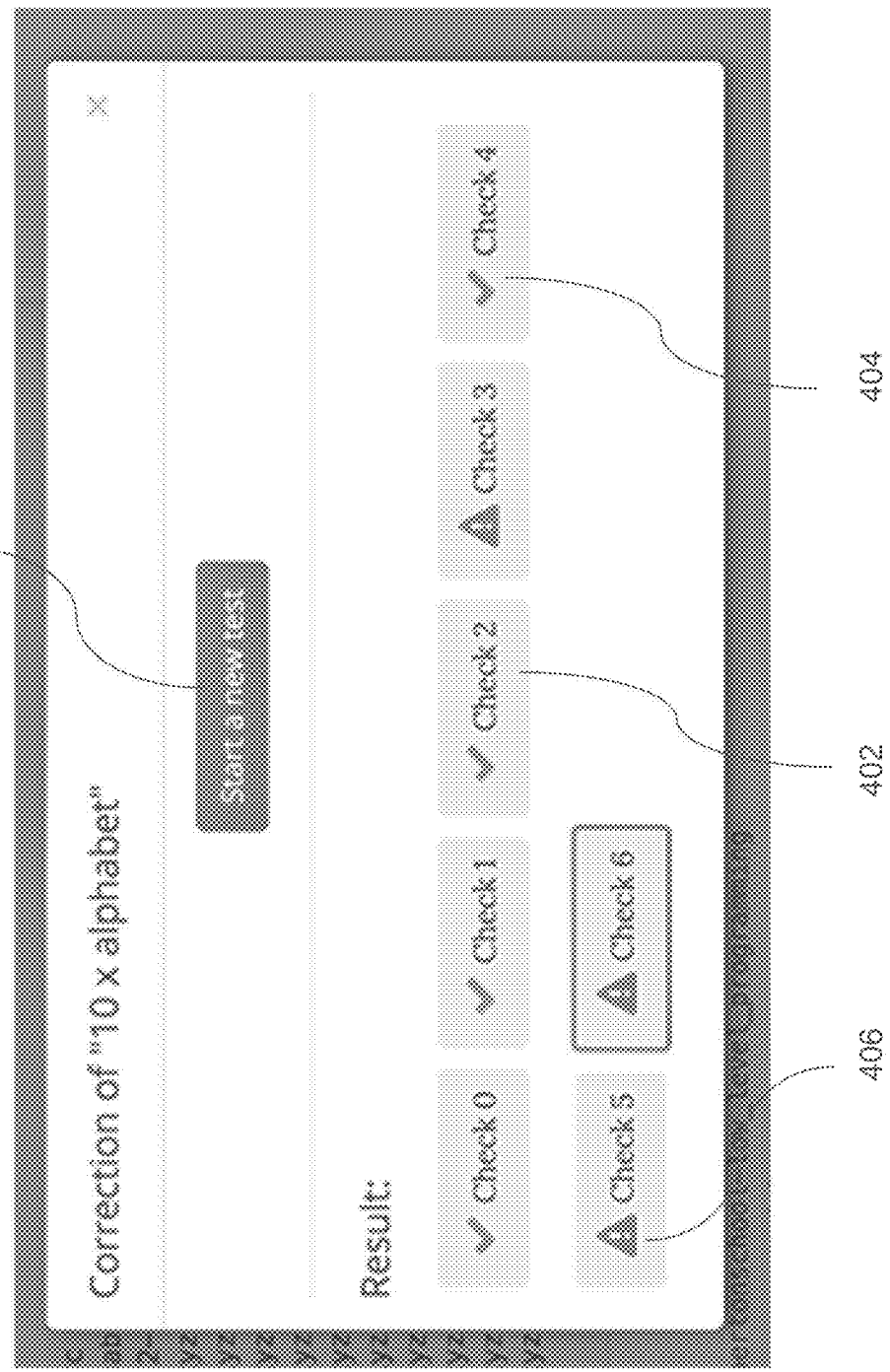

FIG. 4, FIG. 5 illustrate example graphical user interface displays, according to an embodiment.

The CCS automatically grades projects at a time after the deadline/due date for students. However, students can request a correction before the deadline. For example, before the deadline, students can validate basic requirements, such as whether the correct filename is used and whether the deliverable followed all mandatory requirements. Students can test locally on user computers and can test on the CCS. The CCS will provide "hints" about edge cases and requirements missing. In an embodiment, before the deadline, students do not have access to the full result or output of the CCS; students can only see if checks have passed or not.

FIG. 4 illustrates an example student validation interface 400 for the task "10× alphabet." This task may be one of a plurality of tasks for a project. Any number of checks 402 can be validated for a task and seven (7) are shown in the validation interface 400 of FIG. 4 merely for purposes of providing an illustrative example. The validation interface 400 shows a Boolean feedback; validated checks and problematic checks are visibly distinguished with, such as, a check mark 404 or an exclamation mark 406. From the validation interface 400, the student is able to start a new test by activating a new test button 408.

When the CCS grades a task of a project, the CCS generates a full result or output of the correction of the task. The full result may be stored at the CCS and/or locally at the institution, and may be accessible by the staff and/or the student.

FIG. 5 illustrates an example full output 500 of a correction for the task "Numberz." The full output 500 from the correction of "Numberz" is partially shown in FIG. 5. This example correction includes at least eight (8) checks 502, although more or less checks can be performed for a task. The output 500 includes, for each check 502, a description characterizing the check 504, a total available score for the check 506, the score received for the check 508, and a description 510 of any problems or issues encountered during execution of the check.

Using the foregoing techniques, corrections are automatically run for all tasks, for all projects, for all students, for all campuses without any human action. Projects may be released to students at a specific time, such as midnight, local to a campus. Deliverables may be corrected at a specific time, such as the following midnight. The institution server automatically queues all corrections of due projects at the right moment depending on the time zone of the campus, without human action. Corrections are completed in a fast and efficient manner. The disclosed approach eliminates human action that would otherwise be required and improves efficiency use of computing resources, for all the reasons set forth in the preceding paragraphs.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method, performed by one or more computer devices, the method comprising:
receiving a job from a particular priority queue amongst a plurality of priority queues, the job including a deliverable and a plurality of commands, the deliverable being written in a first programming language, the commands being separate from the deliverable and being written in a correction system language that is configured to evaluate deliverables written in the first programming language, each of the commands comprising executable code that is formatted for at least one of testing or grading the deliverable;
performing a correction procedure on the deliverable, wherein the correction procedure comprises, for each of the plurality of commands:
transforming a respective command into a structure of keywords, the keywords comprising functions and operators executable by the one or more computer devices, the structure associated with a flow of execution, the structure including a plurality of nodes, the plurality of nodes including a root node and plurality of parent nodes, each parent node of the plurality of parent nodes having at least one child node, each parent node of the plurality of parent nodes including a keyword in the respective command;
traversing the structure according to the flow of execution, executing one or more keywords at one or more parent nodes of the plurality of parent nodes; and
determining an output of the respective command based on the execution of the one or more keywords at the one or more parent nodes of the plurality of parent nodes; and
using the outputs of the plurality of commands to generate either a first display or a second display depending on whether the particular priority queue from which the job was received is associated with a first priority or a second priority.

2. The computer-implemented method of claim 1, each of the plurality of commands being executable for validating a check of a task associated with the deliverable.

3. The computer-implemented method of claim 1, further comprising:
using identifiers to retrieve deliverables from a third party repository system;
queueing each deliverable retrieved from the third party repository system into one of the plurality of priority queues.

4. The computer-implemented method of claim 3, wherein each of the identifiers identifies a specific repository on the third party repository system, a specific directory in the specific repository, and a specific file.

5. The computer-implemented method of claim 3, wherein deliverables for testing are queued in one or more queues of the plurality of priority queues that are of a first priority and deliverables for grading are queued in one or more queues of the plurality of priority queues that are of a second priority.

6. The computer-implemented method of claim 5, wherein each of the deliverables for grading is automatically retrieved for queuing.

7. The computer-implemented method of claim 3, further comprising receiving the outputs of the plurality of commands.

8. The computer-implemented method of claim 1, further comprising parsing the respective command to extract each keyword in the respective command.

9. The computer-implemented method of claim 1, further comprising stopping the flow of execution when one student error is raised.

10. The computer-implemented method of claim 1, wherein the one or more keywords are executed in a container.

11. One or more non-transitory computer-readable storage media storing one or more instructions which, when executed by one or more computing devices, cause:
receiving a job from a particular priority queue amongst a plurality of priority queues, the job including a deliverable and a plurality of commands, the deliverable being written in a first programming language, the commands being separate from the deliverable and being written in a correction system language that is configured to evaluate deliverables written in the first programming language, each of the commands comprising executable code that is formatted for at least one of testing or grading the deliverable;
performing a correction procedure on the deliverable, wherein the correction procedure comprises, for each of the plurality of commands:
transforming a respective command into a structure of keywords, the keywords comprising functions and operators executable by the one or more computer devices, the structure associated with a flow of execution, the structure including a plurality of nodes, the plurality of nodes including a root node and plurality of parent nodes, each parent node of the plurality of parent nodes having at least one child node, each parent node of the plurality of parent nodes including a keyword in the respective command;
traversing the structure according to the flow of execution, executing one or more keywords at one or more parent nodes of the plurality of parent nodes; and
determining an output of the respective command based on the execution of the one or more keywords at the one or more parent nodes of the plurality of parent nodes; and
using the outputs of the plurality of commands to generate either a first display or a second display depending on whether the particular priority queue from which the job was received is associated with a first priority or a second priority.

12. The non-transitory computer-readable storage media of claim 11, each of the plurality of commands being executable for validating a check of a task associated with the deliverable.

13. The non-transitory computer-readable storage media of claim 11, storing one or more further instructions which, when executed by the one or more computing devices, further cause:
using identifiers to retrieve deliverables from a third party repository system;
queueing each deliverable retrieved from the third party repository system into one of the plurality of priority queues.

14. The non-transitory computer-readable storage media of claim 13, wherein each of the identifiers identifies a specific repository on the third party repository system, a specific directory in the specific repository, and a specific file.

15. The non-transitory computer-readable storage media of claim 13, wherein deliverables for testing are queued in one or more queues of the plurality of priority queues that are of a first priority and deliverables for grading are queued in one or more queues of the plurality of priority queues that are of a second priority.

16. The non-transitory computer-readable storage media of claim 15, wherein each of the deliverables for grading is automatically retrieved for queuing.

17. The non-transitory computer-readable storage media of claim 13, storing one or more further instructions which, when executed by the one or more computing devices, further cause:
receiving the outputs of the plurality of commands.

18. The non-transitory computer-readable storage media of claim 11, storing one or more further instructions which, when executed by the one or more computing devices, further cause:
parsing the respective command to extract each keyword in the respective command.

19. The non-transitory computer-readable storage media of claim 11, storing one or more further instructions which, when executed by the one or more computing devices, further cause:
stopping the flow of execution when one student error is raised.

20. The non-transitory computer-readable storage media of claim 11, wherein the one or more keywords are executed in a container.

21. A computer-implemented method, performed by one or more computer devices, the method comprising:
receiving a computer program correction job from a particular priority queue amongst a plurality of priority queues, the computer program correction job including a set of computer program source code statements for evaluation and a plurality of commands, the set of computer program source code statements being written in a first programming language, the commands being separate from the set of computer program source code statements and being written in a correction system language that is configured to evaluate computer program source code statements written in the first programming language, each command comprising executable code that is formatted for at least one of testing or grading the set of computer program source code statements;

performing a correction procedure on the set of computer program source code statements by, for each of the plurality of commands:

transforming a respective command into a structure of keywords, the keywords comprising functions and operators executable by the one or more computer devices, the structure associated with a flow of execution of a correct version of a computer program represented in the set of computer program source code statements, the structure including a plurality of nodes, the plurality of nodes including a root node and plurality of parent nodes, each parent node of the plurality of parent nodes having at least one child node, each parent node of the plurality of parent nodes including a keyword in the respective command;

traversing the structure according to the flow of execution, executing one or more keywords at one or more parent nodes of the plurality of parent nodes; and determining an output of the respective command based on the execution of the one or more keywords at the one or more parent nodes of the plurality of parent nodes; and using the outputs of the plurality of commands to generate either a first display or a second display depending on whether the particular priority queue from which the computer program correction job was received is associated with a first priority or a second priority.

* * * * *